United States Patent Office 3,121,276
Patented Feb. 18, 1964

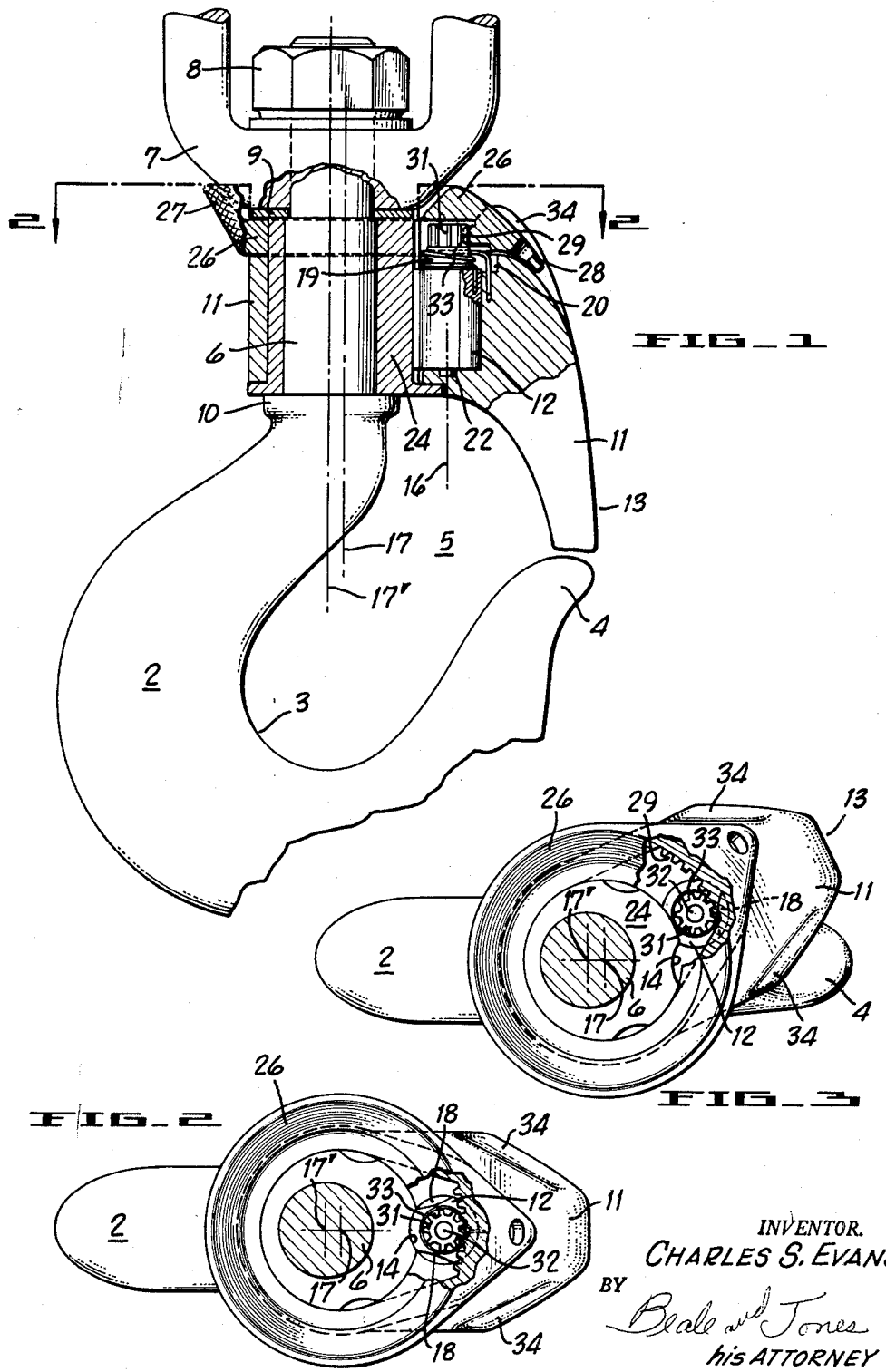

3,121,276
SAFETY HOOK
Charles S. Evans, 124 Isabella Ave., Atherton, Calif.
Filed Oct. 8, 1963, Ser. No. 314,666
10 Claims. (Cl. 24—241)

My invention relates to hoisting hooks and the broad purpose of my invention is the provision of an improved safety gate for preventing accidental release of the load in the hook, and unintended snagging of the hook in extraneous objects or structures.

Other objects of the invention include the provision of:

A safety gate which closes from open position and locks automatically.

A safety gate movable to closed or open position manually or by a jerk line from a remote point.

A safety gate which is secure against accidental opening because of collision with some other object.

A safety gate of rugged simple construction, with costs of manufacture and assembly in the low range.

A safety gate characterized by a simple, rugged structure, convenient and dependable construction, and adaptable for use in a wide variety of sizes and types of hoisting hooks.

A safety gate in which the engaging faces of the locking parts provide a wear resistant area of high resistance and many times sufficient to prevent any accidental release and yet in orderly operation are released near instantly.

Other objects will be set forth in the following description of the invention which is illustrated in the accompanying drawings. It is understood that I do not limit myself to the embodiment of my invention shown in the said description and drawings, as I may adopt other embodiments within the scope of my invention as set forth in the claims.

In the drawings, I have chosen for illustration a number 6 hook of conventional shape having a 3/4" x 3" finished size shank and 1 3/8" throat opening.

FIGURE 1 is a side elevation partly in central vertical section. Portions of the figure are broken away to reduce the size of the figure.

FIGURE 2 is a transverse sectional view taken in the compound plane indicated by the line 2—2 of FIGURE 1. The gate is shown to be locked.

FIGURE 3 is a transverse sectional view similar to FIGURE 2, but showing the locking parts with the gate partly open.

The use of safety gates on hoisting hooks has increased greatly in recent years, not only in accompanying the normal expansion of industry, but because of the steady pressure to provide greater safety to workmen. An open hook swinging on a hoisting line can be a serious menace to workmen and property whether it is empty or loaded. Besides an accidental release of its load, an open hook may be snagged in running gear and rigging or even in stationary parts of building or ship in spite of skilled handling by the hoist or crane operator. Any such mishap may cause injury or death to adjacent workmen in addition to serious property loss. An open hook is particularly troublesome or even hazardous in lumbering and dragline operations, where fallen logs are dragged over ground covered with undergrowth. In such cases, a hook having a locked gate and with no projecting parts is necessary for prompt release of its load and its efficient use.

In order to accomplish the several advantages which I secure in the structure of my present invention, I enclose a rotatable cylindrical locking roll substantially within the body of the gate and in substantial parallelism with the cylindrical shank of the hook.

My gate is journaled on the shank of the hook, between the bail and the hook body; and actuating means for the locking roll to turn it into and out of locking engagement with the shank is provided. Preferably such actuator overlies the top surface of the gate and the upper end of the locking roll. So positioned, it is conveniently reached from any side by the hand of the operator, and given the necessary turn of 90° or less about its axis to free the locking roll from its engagement in the side of the shank, so that the gate in the same movement of the operator's hand, and may be pushed in the same general direction to one side or the other, thus opening the throat of the hook. Means are provided for retaining the gate in open position to permit loading of the hooks and also for returning the gate to locked position when such return is desired.

In detail, my safety hook comprises a main body 2 which curves around in the bight 3 and ends in the point 4, spaced from the other end of the body to form a throat 5, through which the cable ties or chain supporting the load must pass to lodge in the bight.

Extending upwardly from the body 2 is a cylindrical shank 6, on the end of which a conventional bail 7 is secured by a nut 8, threaded on the shank over a bearing washer 9. The upper end of the body 2 is formed with a flange 10; and that portion of the shank lying between the flange and the bail base provides the journal mounting arranged in the head of the gate 11.

Hook forgings in their common or standard proportions are designed to carry up to 50% above safe working load. Failure of the hook above that, being usually in a straightening of the hook to widen the throat rather than in any distortion of the shank. Since the locking means in my hook includes a cylindrical locking roll 12, extending substantially in parallelism along the 3/4" shank, and lying at a maximum depth in a #6 hook of about .010" within its cylindrical surface, the cross sectional area through the shank at the intersection is not materially reduced or the shank critically weakened in tensile strength.

The gate swings freely about the shank axis to close the throat 5, with its free end 13 aligned with the hook point 4, or on one side to leave the throat wide open. Means are provided for automatically locking the gate in either position; that is to say, automatically locking the gate across the throat as shown in FIG. 1, or automatically locking the gate to one side, leaving the throat open. From either of these positions it must be unlocked before it can be moved.

Such locking means comprise a cylindrical locking roll 12 journaled in the inner portion of the gate adjacent the shank and in parallelism with the shank. Considered geometrically the two cylindrical concepts of shank and locking roll intersect in long straight lines parallel to both their axes which are also parallel to each other, that is, the distance between the shank axis and the cylindrical locking roll axis is less than the sum of their respective radii. They may be studied for practical derivations under the broad title "Intersection of Solids." As the principle is applied to the solid bodies of shank and roll, the shank is formed with a longitudinally extending groove or recess 14 in which the locking roll 12 may lie with its axis 16 parallel to the shank axis 17; and the locking roll 12 is similarly formed with a longitudinally extending groove or recess 18 in which the shank may lie with its axis 17 parallel to the roll axis 16.

With a gate rotatably mounted on the cylindrical shank and a cylindrical locking roll rotatably mounted in the gate and also extending into the groove or recess of the shank, the roll may be turned to align its recess with the cylindrical surface of the shank so that the gate may be moved to one side or the other. But if the roll is turned to seat its solid cylindrical body in the groove or recess of the shank, movement of the gate about the shank is prevented.

Surrounding the upper end of the roll 12, the bore is widened to provide, with the reduced end 19 of the roll, a recess 20 in which a spring 33 surrounds the roll end. The spring at no tension is anchored in both roll 12 end and gate 11 with the body of the roll lying in the groove 14 of the shank as in FIGURE 1. When the roll is given rotary movement to one side or the other to open the throat (as suggested in FIG. 3) the spring is tensioned, and when the gate is released, it tends to return to central position closing the hook throat as shown in FIG. 1. The main body of the roll has a journal bearing in the gate; and preferably an additional bearing is supplied by the stub shaft 22 at the bottom of the roll.

While my gate may be journaled directly on the shank 6 of a standard hook, certain advantages are obtained by enlarging the shank by securing thereon the eccentric sleeve 24, and journalling the gate on the sleeve. If desired, the hook shank may be formed integrally and eccentrically in the first forging, with the elongated recess or groove 14 formed therein, and being bisected by a plane cutting through the point 4 of the hook body, and axis 17 or 17′ as the case may be.

The shank formed either as as enlarged by the eccentric sleeve 24 or integrally in the original forging, provides certain advantages. With the eccentric shank formed integrally or by shrinking on a sleeve, even a slight weakening of the standard shank is avoided; and by the use of a bronze sleeve an improved bearing surface is provided for the ferrous surfaces of the gate and roll. The gate locking surfaces operate at a longer leverage from the central axis of the hook, and more space is provided around the upper part of the gate for the hand of the operator to open or close the gate. These considerations are of importance with the smaller hooks, say below #8.

Means are provided between the gate and the bail, and turnable by the gloved hand and fingers of the operator for throwing the gate to one side or the other of the hook point 4 to open the throat for loading.

The ring lever 26 is journaled on the shank above the gate and overlies the upper surface of the gate. The ring lever has an outer knurled surface 27 which extends upwardly around the lower portion of the bail 7, and merges into an apertured stub end 28 at the upper front of the gate. The knurled surface and apertured stub end aid in turning the ring lever by hand or stick.

On the inner surface of the ring lever near the stub end as best shown in FIGS. 2 and 3, is disposed an array of teeth in a curved rack 29 of calculated length, and radius from axis 17 of the enlarged shank 24. These gear teeth are in permanent mesh with a small pinion gear 31, rigidly fixed on the reduced end 32 of the roll 12, and spaced from the full diameter of the roll by a reduced section sufficient to carry 3 or 4 turns of a coil spring 33.

The two ends of the spring are anchored in the roll and gate; and from a position of no tension as in FIG. 2 a swinging of the ring lever in either direction places the spring in tension, urging a recovery movement to central or locked position.

It will be observed that the ring lever 26 is actually just that—a ring surrounding and bearing on the cylindrical surface of the shank 24, that is to say pivoted on the center 17, the stub end 28 forming the free end of the lever and upon which pressure to lock or unlock the gate is concentrated (accompanied optionally and usually by the gripping of the thumb and first finger about the knurled surface 27 of the ring). The point of first application of force resulting from pressure on the lever end 28 is the point of tangency between rack teeth 29 and pinion 31. There is thus a considerable increase in leverage available about the ring lever and its end 28 for turning the locking roll to free it from its locking position as shown in FIG. 2, and position it to slide on the cylindrical surface of the shank as in FIG. 3.

A rather heavy spring 33 is therefore used to put recovery pressure on the roll so that when the roll is positioned to slide over the cylindrical surface of the shank as in FIG. 3, the pressure will produce a braking effect tending to hold the gate in whatever position it is moved to, but snap the roll into rotation and locking engagement with the shank when the gate is moved back to suitable position.

Since the stub end 28 could conceivably be struck and moved accidentally even though very short and close to the gate surface and protected by the bail, low lying flanges 34 are provided on the upper surface of the gate to shield the stub end of the ring lever, and also form a stop for limiting movement of the pinion relative to the rack.

It should be noted that when the ring lever is moved in either direction to unlock the gate, pressure continued in the same direction moves the gate to fully clear the throat for loading the hook. The first turning of the ring lever 26 frees the lock roll and places it in "slide" relation to the shank 24 as in FIG. 3. Further movement engages the stub end 28 with the protective rib 34 (or 35) and carries the entire gate to the side as desired.

While low lying protective flanges 34 and 35 act as stops to restrain rotation of the pinion 31, I prefer to rely on the more accurate and direct meeting of the pinion with the rack ends 36.

I claim:

1. A hoisting hook having a cylindrical shank and a hook body with an open throat,
    a gate journaled about the shank for free rotary movement across the throat to close or open the throat,
    said shank having a groove therein with a cylindrical surface, said groove extending longitudinally of the shank and in parallelism therewith, and
    a cylindrical locking roll journaled in the gate in parallelism with said shank and having a groove with a cylindrical surface, said groove extending lengthwise of said roll and in parallelism therewith,
    said gate having at least one locking position wherein said locking roll has a portion lying in said shank groove,
    said gate having unlocked positions wherein a portion of said shank lies in said locking roll groove,
    whereby said gate is placed in its locking position by aligning said locking roll with said shank groove, and then rotating said locking roll so that said portion thereof lies in said shank groove.

2. A hoisting hook in accordance with claim 1 in which means are included for selectively rotating the locking roll to engage it with or disengage it from said shank.

3. A hoisting hook in accordance with claim 1 in which stop means are arranged on the gate to limit the rotary movement of the locking roll in the gate.

4. A hoisting hook in accordance with claim 1 in which spring means is interposed between the locking roll and the gate to effect recovery movement of the locking roll.

5. A hoisting hook in accordance with claim 1 in which spring means urge rotation of the locking roll to engage the shank and manually operable means is provided to disengage the locking roll from the shank.

6. A hoisting hook having a hook body with an open throat and a cylindrical shank having a groove therein with a cylindrical surface, said groove extending longidinally of the shank,
    a gate journaled about the shank for free rotary movement across the throat to close or open the throat,
    a cylindrical locking roll rotatably journaled in the gate and having an axially parallel portion thereof seated in the shank groove to lock the gate across the throat, said locking roll having a groove with a cylindrical surface extending longitudinally thereof whereby rotary movement of the locking roll frees it from said shank as said grooves are aligned, and means for selectively rotating the locking roll to engage it with or disengage it from said shank.

7. A hoisting hook having a hook body with an open throat and a cylindrical shank having a groove therein with a cylindrical surface, said groove extending longitudinally of the shank, a gate journaled about the shank for free rotary movement across the throat to close or open the throat, a cylindrical locking roll rotatably journaled in the gate and having an axially parallel portion thereof seated in the shank groove to lock the gate across the throat, said locking roll having a groove with a cylindrical surface extending longitudinally thereof whereby rotary movement of the locking roll frees it from said shank as said grooves are aligned, a gear pinion fixed for rotation with said locking roll, and a ring lever journaled about the shank and having a curved rack meshing with said pinion whereby movement of the pinion will rotate said locking roll.

8. A hoisting hook having a cylindrical shank and a hook body with an open throat, a gate journaled about the shank to close or open the throat, a cylindrical locking roll journaled in the gate and parallel to the shank, each said roll and shank having in the side thereof an axially parallel cylindrical groove complementary to the cylindrical shape of the other, spring means interposed between the roll and the gate and urging rotation of the roll wherein at least a portion of said roll engages in the shank groove whereby the gate is in locked position to close said throat, and means for rotating the roll against the spring means to align the cylindrical groove in the roll with the cylindrical groove of the shank whereby the gate may be rotated to open said throat.

9. A hoisting hook having a cylindrical shank and a hook body with an open throat, a gate journaled about the shank to close or open the throat, a cylindrical locking roll journaled in the gate and parallel to the shank, each said roll and shank having in the side thereof an axially parallel cylindrical groove complementary to the cylindrical shape of the other, and means for selectively rotating the roll wherein at least a portion of its cylindrical body engages within the shank groove whereby the gate is in locked position to close said throat or to align its cylindrical groove with the cylindrical groove of the shank whereby the gate may be rotated to open said throat.

10. A safety gate for a hoisting hook which has a cylindrical shank having a longitudinal axis in which there is a longitudinally extending groove having a cylindrical surface, comprising a gate having a head for journaling on the cylindrical shank of the hook and a tail on the head for closing the throat of the hook, a locking roll journaled in the gate structure and having its longitudinal axis spaced from the longitudinal axis of the shank a distance less than the sum of the radii of said shank and said locking roll, each such shank and locking roll being formed with such a cylindrical groove extending lengthwise thereof as to permit the other to lie therein in complement, and to enable the locking roll to be given rotary motion to lock the gate against rotation in the shank when the roll seats complementarily in the shank, or to unlock the gate for rotary movement about the shank when the roll is rotated to align its groove with the shank groove, and means for selectively rotating the locking roll.

References Cited in the file of this patent
UNITED STATES PATENTS

| | | |
|---|---|---|
| 1,918,114 | Lorenzen | July 11, 1933 |
| 2,728,967 | Burnham | Jan. 3, 1956 |
| 2,835,013 | Thompson | May 20, 1958 |